Sept. 14, 1965    W. F. FISCHER    3,205,758
THREADLESS RETAINING PLATE
Filed Nov. 14, 1961
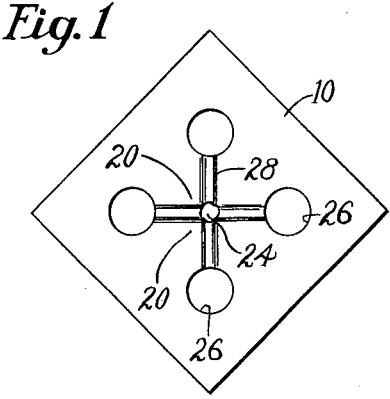
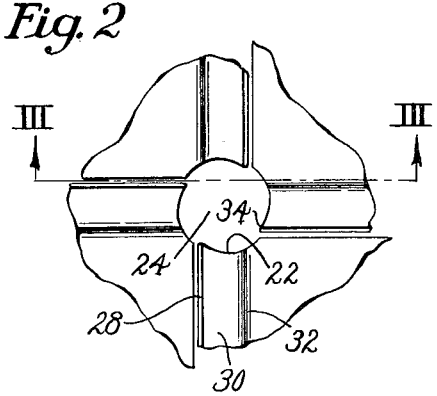
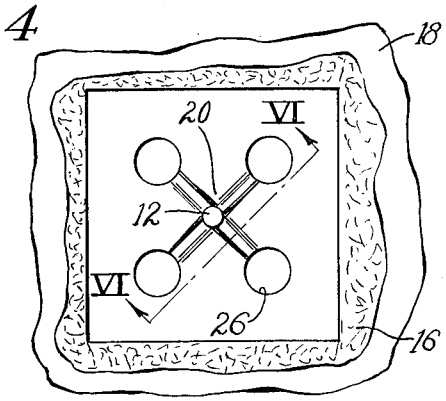
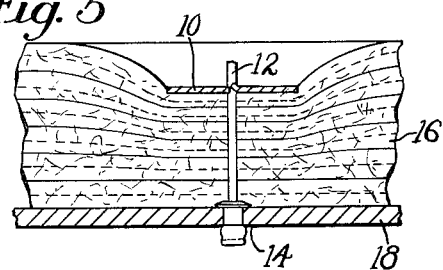
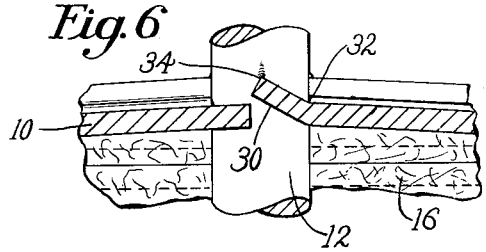
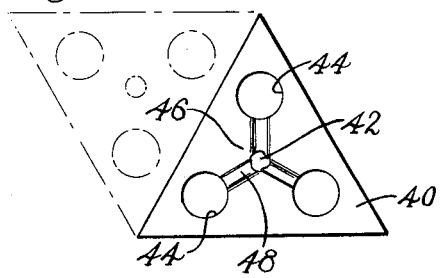
Inventor
Walter F. Fischer
By his Attorney
Robert S. Ross

United States Patent Office 3,205,758
Patented Sept. 14, 1965

3,205,758
THREADLESS RETAINING PLATE
Walter F. Fischer, Seymour, Conn., assignor to United Shoe Machinery Corporation, Boston, Mass., a corporation of New Jersey
Filed Nov. 14, 1961, Ser. No. 152,331
3 Claims. (Cl. 85—36)

This invention relates generally to fastening devices, and has particular reference to an article retaining plate which is adapted for assembly onto a stud or mandrel to be retained therein by frictional engagement.

One application in which the herein described device is adapted for use is the assembly of an insulating blanket onto a sheet metal article such as a panel or fabricated duct work. It has been found that such insulating blankets, which have very little tensile strength and poor resistance to delamination, may be securely assembled by attaching to the panel a blind rivet of the mandrel-set type, impaling the blanket over the protruding mandrels, and assembling retaining plates onto the ends of the mandrels.

Although many types of fasteners have been devised which are adapted to be pushed onto a smooth stud or mandrel for frictional engagement therewith, a fastener for use in the above described assembly has certain requirements not met by previously known fasteners. In most applications, in which this type of fastener is used, the fasteners are designed to resist high disassembly forces, which forces are utilized to enhance the holding action to resist shock and vibration. Such action is accomplished by providing inclined tongues which increases in biting force with increasing load. To resist high disassembly forces, such fasteners are customarily formed of relatively rigid material, such as hardened steel, and consequently require a relatively large start-on force for assembly.

In the insulating assembly described above, the fasteners are assembled manually and when properly assembled, are pushed onto the mandrel only far enough to compress slightly the insulation blanket. Hence the disassembly force is relatively slight, and does not provide any substantial amount of increased biting action to enable the fastener to resist shock and vibration. The use, in such assemblies, of fasteners having a high start-on force is undesirable, since there is a tendency for such fasteners to be pushed too far into the stud after the initial start-on force has been overcome, thereby unduly compressing the insulation and imparing its effectiveness.

The object of this invention is to provide an improved retaining plate which is particularly adapted for use in an insulation assembly to retain an insulating blanket in assembly with a support panel.

A further object of the invention is to provide a retaining plate for the purpose described which requires a relatively low force for assembly into a mandrel, yet, provides adequate resistance to shock and vibration even under no-load conditions.

A further object of the invention is to provide a retaining plate for the purpose described which may be formed of a substantially flat sheet of unhardened steel.

Other objects of the invention will be apparent from the following description of a specific embodiment thereof.

In the drawing:

FIG. 1 is a top plan view of a retaining plate embodying the features of the invention;

FIG. 2 is an enlarged view of the center portion of the plate of FIG. 1;

FIG. 3 is a view in section taken on line III—III of FIG. 2;

FIG. 4 is a top plan view of an insulation assembly utilizing the retaining plate of FIG. 1;

FIG. 5 is a view in section taken on line V—V of FIG. 4;

FIG. 6 is an enlarged view of the medial portion of the plate and mandrel assembly of FIG. 5; and FIG. 7 is a top plan view of a modified form of retaining plate embodying the features of the invention.

Referring to FIGS. 1–6 of the drawing, there is illustrated a retaining plate 10 which is particularly adapted for assembly onto a mandrel 12 of a blind rivet 14, to retain an article such as a blanket of insulating material 16 in assembly with a panel 18.

The plate 10 may be formed of any suitable material, for example, low carbon steel, and in the illustrated embodiment is provided with a series of inwardly extending tongues 20, having end portions 22 disposed about a central opening 24 to engage a mandrel inserted through the opening in a manner to appear hereinafter.

The illustrated embodiment of the invention may be conveniently manufactured by punching a round central opening in a suitable blank, and punching a series of outer openings 26 about the central opening, uniformly spaced therefrom. The tongues 20 may then be formed by shearing the plate between the central opening and each outer opening, preferably without the removal of metal, along shear lines 28, and then bending corresponding side edge portions 30 of each tongue upwardly out of the general plane of the plate along a bend line 32 which is generally parallel to the adjacent shear line.

In the illustrated and preferred embodiment, the shear lines 28 extend from the outer openings toward the central aperture in a direction slightly offset from the direction of the center of said central aperture so as to intersect the periphery of the aperture at a position which is offset clock-wise (as seen in FIG. 2) from the point at which a diameter of the central aperture parallel to the shear line intersects said periphery. Similarly, each bend line 32 is disposed to intersect the periphery of the central aperture at a position which is offset counterclockwise from the point at which said diameter parallel to the shear line intersects said periphery. Hence, when said side edge portion 30 of each tongue is bent upwardly, the motion of the corner 34 of said portion 30 moves, as seen in plan projection along a chord of the periphery central opening, so that after such bending, said point is closer to the center of said central aperture than any other portion of the end of the tongue.

Hence, when the plate 10 is assembled onto the mandrel 12 as illustrated in FIGS. 4–6 the engagement of the tongues 20 with the mandrel is through the points 34 of the tongues. Since the mandrel is larger than the original diameter of the central opening 24, said assembly causes the tongues 20 to be flexed upwardly. After assembly is completed, the slight upward force of the compressed insulation tends to cause the tongues to dig into engagement with the mandrel. The effectiveness of such engagement is enhanced by the fact that on any downward motion of the tongues relative to the plate (resulting from the upward biasing force of the compressed insulation) the tongues tend to move about a flexing line which extends generally between the two apertures 26 at the base of the tongue, and hence the points 34 in the ends of the tongues do not move directly against the mandrel toward the axis thereof, but engage the mandrel in inclined relation to the axis thereof, providing a wedge action to increase the engaging pressure of said points.

The configuration of the tongues imparts a relatively high flexibility to the tongues as a unit, so that a relatively low start-on force is required, and the above described configurations of the end portions of the tongues give a high resistance to shock and vibration, even though the constant disassembly force maintaining the tongues in engagement with the mandrel is relatively low.

Referring to FIG. 7, there is illustrated a modified form of retaining plate 40, which is generally triangular in outline, having a central opening 42, and three outer openings 44. Three tongues 46 are formed by shearing the plate between the central opening and the outer openings, and bending the side edge portions 48 upwardly, with the shear lines and bend lines being disposed in relation to the central aperture in the manner previously described.

Although the illustrated embodiment of the invention is formed of relatively thin low carbon sheet steel, for use in a specific application where a low start-on force is required, it will be understood that the features of the invention may be utilized to provide fasteners for more severe requirements, where the strength of hardened high carbon steel of great thickness is desired.

Since certain other obvious changes may be made in the device without departing from the scope of the invention, it is intended that all matter contained herein be interpreted in an illustrative and not a limiting sense.

Having thus described my invention, what I claim as new and desire to secure by Letters Patent of the United States is:

1. A retaining plate for assembly onto a mandrel, said plate being formed of a substantially flat piece of resilient material and comprising a series of inwardly extending tongues positioned about a mandrel-receiving aperture, the major portions of each tongue lying in the general plane of the plate and having an originally acurate mandrel-engaging end portion, corresponding portions of said tongues adjacent a side edge thereof being bent upwardly out of the general plane of the plate along a bend line which is generally parallel to said side edge and intersects the arcuate end thereof at a medial portion, whereby one portion of said arcuate end is inclined upwardly and projects radially inwardly further than the portion lying in the general plane of the plate.

2. A retaining plate for assembly onto a mandrel, said plate being formed of resilient material and comprising a central aperture having a diameter less than that of the mandrel onto which the plate is to be assembled, and a series of outer apertures uniformly disposed about the central aperture and spaced radially therefrom, the plate being sheared along lines extending between each outer aperture and the central aperture forming inwardly extending tongues, a side edge portion only of each tongue being between the central aperture and an outer aperture bent upwardly out of the general plane of the plate along a bend line which is generally parallel to the shear line, whereby the end of said side edge portion is disposed for inclined engagement with said mandrel.

3. A retaining plate for assembly onto a mandrel, said plate being formed of resilient material and comprising an originally circular central aperture having a diameter less than that of the mandrel onto which the plate is to be assembled and a series of outer apertures uniformly disposed about the central aperture and spaced radially therefrom, the plate being sheared along lines extending from each outer aperture to the central aperture forming inwardly extending tongues, each of said shear lines intersecting the periphery of said central aperture at a position offset circumferentially in one direction from the point at which a diameter of the central aperture extending parallel to the shear line intersects the periphery thereof, corresponding side edge portions only of each tongue alongside the shear line being bent out of the general plane of the plate along a bend line substantially parallel to and spaced from the adjacent shear line a distance such that the bend line intersects the periphery of the central aperture at a position which is spaced circumferentially from said point at which said diameter intersects the periphery of said central aperture and is disposed on the opposite side of said point from said position at which the shear line intersects said central aperture.

References Cited by the Examiner

UNITED STATES PATENTS

| 986,255 | 3/11 | Whitney | 85—36 |
| 2,754,717 | 7/56 | Becker | 85—36 |
| 2,862,413 | 12/58 | Knohl | 85—36 |

FOREIGN PATENTS

| 60,127 | 8/54 | France. |

EDWARD C. ALLEN, Primary Examiner.

JOSEPH S. REICH, Examiner.